United States Patent [19]

Bagby

[11] 4,040,110
[45] Aug. 2, 1977

[54] VIDEO HEAD ASSEMBLY HAVING DISCRETE ARCURATE CERAMIC PIECES ON ROTOR BETWEEN HEADS

[75] Inventor: John F. Bagby, Encinitas, Calif.

[73] Assignee: Spin Physics, Inc., San Diego, Calif.

[21] Appl. No.: 612,601

[22] Filed: Sept. 12, 1975

[51] Int. Cl.² .......................... G11B 5/22; G11B 5/52; G11B 15/60
[52] U.S. Cl. .................................. 360/107; 360/122; 360/130
[58] Field of Search ............... 360/107, 122, 128–130, 360/104, 84

[56] References Cited

U.S. PATENT DOCUMENTS

| 3,244,818 | 4/1966 | Bick et al. | 360/107 |
| 3,335,412 | 8/1967 | Matsumoto | 360/122 |
| 3,363,066 | 1/1968 | Prochnow | 360/107 |
| 3,370,282 | 2/1968 | Baldwin et al. | 360/122 |
| 3,592,976 | 7/1971 | McGinnis | 360/130 |
| 3,614,831 | 10/1971 | Grundtner et al. | 360/104 |

Primary Examiner—Alfred H. Eddleman
Attorney, Agent, or Firm—Robert F. Cody

[57] ABSTRACT

In a video head assembly employing ceramic-ferrite transducer heads, the present invention proposes modification of head assembly components, i.e., the recording tape vacuum guide and the head wheel, so that a head assembly may be provided which possesses an operating lifetime commensurate with the ceramic-ferrite transducer heads. The invention proposes a head wheel having an outer surface which will wear to an unacceptably out-of-round condition at a significantly slower rate than present head wheels. To complement the proposed head wheel, the invention further proposes a tape guide having a guide surface so constructed as to wear more slowly than present tape guides so the radius as defined by the SMPTE will be maintained for more tape hours, thus helping to retain the proper guide surface contour throughout the life of the transducer heads.

2 Claims, 5 Drawing Figures

VIDEO HEAD ASSEMBLY HAVING DISCRETE ARCUATE CERAMIC PIECES ON ROTOR BETWEEN HEADS

BACKGROUND OF THE INVENTION

1. Field of the Invention

The present invention relates to a video head assembly for use in a transverse scanning video recording machine, and more particularly to a head assembly wherein the tape guide and the head wheel have been modified to produce a head assembly capable of a substantially increased lifetime.

2. Description Relative to the Prior Art

When selecting a video recording machine for use in applications wherein quality of recording is of prime importance and cost is a secondary consideration, one is likely to choose a video recording machine of the transverse scanning type. The mechanical heart of a transverse scanning video recording machine is the video head assembly. The head assembly comprises a rotary head wheel, a set of magnetic transducer heads mounted to the head wheel, and a vacuum guide having a surface over which a recording tape is advanced as it passes through the head assembly.

After investing in a transverse scanning recording machine, the user may generally enjoy up to 300 or 400 hours of satisfactory performance in a typical broadcasting environment. After about 350 hours of use, the head assembly must be disassembled, worn components replaced, and parts aligned to meet specifications; usually, the worn components are the transducer heads which have worn past the usable stage. In addition to having to replace the transducer heads every 350 hours, or thereabouts, the vacuum guide needs replacement or repair after about 1,000 hours of use. In other words, about every third time the transducer heads are replaced, the vacuum guide should also be replaced (or repaired). An improved video head assembly is obliged to anticipate failure due to all components therein, i.e., the transducer heads, the vacuum guide, and the head wheel.

In the present state of the art, the transducer heads are made of a magnetic metal, such as Alfesil or Sendust. The heads are mounted on a rotary head wheel generally constructed of chrome-plated metal. The vacuum guide commonly comprises a single piece of metal, such as aluminum or steel, machined to have a tape guide surface and necessary vacuum passageways to provide suction for holding the recording tape to the guide surface as it passes through the head assembly.

The magnetic metals used in the transducer heads are relatively soft and tend to wear rapidly, the average head life, as previously mentioned, being about 350 hours. Now it is well known that ferrite is a substantially harder material than the magnetic metals. In fact, the increased hardness of ferrite may allow a transducer head life time in excess of 1,500 hours. Also, the high frequency permeability of ferrite is much greater than that of metal, thereby enabling an improved frequency response to be obtained. As would be expected, attempts have been made to employ ferrite as the transducer head material. Unfortunately, in addition to being harder than the magnetic metals, ferrite is also more brittle. And, as a result, attempts to use ferrite as the head material have generally been unsuccessful, the brittle ferrite being unable to withstand the severe contact forces encountered in the head assembly.

In U.S. patent application Ser. Nos. 668,873 and 734,698, a transducer head is proposed which obtains the advantages of the ferrite head while providing protection for the brittle ferrite. Disclosed in the application is an improved transducer head comprising a ferrite head provided with ceramic support shoes, or inserts. It is this ceramic-ferrite combination which is able to withstand the harsh environment in a transverse scanning video recording machine. The ceramic evidently absorbs a major portion of the "pounding" and provides the support necessary to prevent the ferrite from shattering. Evidently, the substitution of ceramic-ferrite transducer heads for metal transducer heads in an otherwise unmodified head assembly should not present any particular problems, and the head assembly should now perform satisfactorily for about 1,500 hours (ignoring, for the moment, the fact that the vacuum guide generally fails after only 1,000 hours of operation). In actual practice, however, it would be expected that the "improved" head assembly would not perform adequately for the 1,500 hours expected of the transducer heads. The reason for this expected premature failure of the head assembly would not be apparent upon visual inspection of the ceramic-ferrite transducer heads, the head wheel, or the vacuum guide. Only with a miscroscope, sensitive micrometer, or similar device, would one perceive the source of the problem.

FIG. 1 shows a head wheel 10 having ceramic-ferrite transducer heads 12a, b, c, and d, as it would appear if taken from the head assembly after perhaps 1,000 hours of operation (about the time when performance may become unsatisfactory). The enlarged view from the area of the head wheel in the immediate vicinity of the ceramic-ferrite head 12a shows the problem. The ceramic-ferrite head 12a protects the portions 14a and b of the head wheel immediately adjacent thereto from wear, thereby causing a slight out-of-round wearing of the head wheel, the head wheel taking on a generally cruciform shape, having a small protuberance around each head. Although the out-of-roundness is not even visible to the unaided eye, it occurs on a critical surface. During operation, the head wheel rotates as a recording tape is advanced over a guide surface on the vacuum guide. The guide surface generally has a groove perpendicular to the direction of tape travel over which the tape passes and in which the head wheel slightly extends, and in which the transducer heads more significantly extend. In practice, the tape vibrates due to the periodic passes of the transducer heads mounted to the rotary head wheel. When the head wheel itself has worn out of round, this vibratory effect is not damped by the head wheel and, though not apparent to the naked eye, the recording tape literally "flaps" as it passes through the head assembly. As the tape flaps, tape stretch is no longer constant and the information may be recorded with some amplitude modulation, degrading video performance. Therefore, to obtain better improvement in head assembly life time through the use of a ceramic-ferrite head, a head wheel is provided which is so designed as to resist wearing in a generally cruciform shape, or other out-of-round shape, during normal operation.

To realize the full advantage of a ceramic-ferrite head (assuming now, for the moment, that a head wheel may be provided which will not cause the head assembly to fail before the ceramic-ferrite heads themselves wear out), a vacuum guide must be provided which does not require repair or replacement before the ceramic-ferrite heads. A typical vacuum guide is shown in FIG. 2. As a tape is advanced over the guide surface 16 in the direction indicated by the arrow (the tape being held against the surface by vacuum suction via a pair of passageways 18 and 20), the surface wears. The result of such wear is to change the radius of curvature of the guide surface 16 to where it no longer matches the SMPTE standard. When this wear becomes severe, as indicated in an exaggerated manner by the dotted line 23, serious time base errors may be introduced and the vacuum guide should generally be replaced. As previously stated, this vacuum guide failure may occur before the ceramic-ferrite heads fail. Thus, an improved head assembly should take this factor into account by providing a vacuum guide more suitable for use with a head assembly employing ceramic-ferrite heads.

SUMMARY OF THE INVENTION

In order to realize the potential advantages obtainable from the use of a ceramic-ferrite head in a video head assembly, the invention so modifies the components of the head assembly that they cooperate with the ceramic-ferrite heads and, importantly, with each other to produce an improved head assembly, generally requiring service and replacement of parts only one-third to one-fifth as often as a conventional head assembly, and yet providing improved performance throughout this trebled head assembly lifetime.

In accordance with the invention, a head assembly employs ceramic-ferrite transducer heads. And to complement the ceramic-ferrite transducer heads, and to prevent out-of-round or cruciform wearing of the head wheel, the invention proposes the use of a head wheel having an outer surface which wears more slowly than the present state of the art head wheels. To cooperate with the proposed head wheel and to complete the improvement of the head assembly, the invention further proposes a vacuum guide having a guide surface that wears slowly enough to maintain the radius of curvature within the SMPTE standard for the life of the ceramic-ferrite heads.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 3:
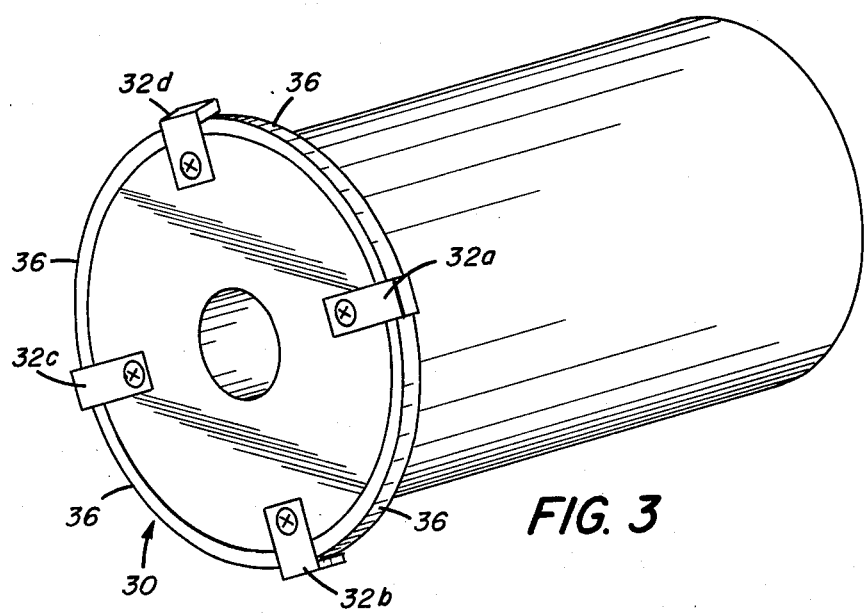
FIG. 3 shows a head wheel modified in accordance with the present invention to obtain the advantages of the ceramic-ferrite heads mounted thereto.

Referring to FIG. 3, a head wheel, generally designated 30, is shown as it would appear after modification in accordance with the invention to slow the tendency to wear in a cruciform shape. The head wheel 30, as indicated, would have arcuate ceramic pieces 36 which would protect the periphery of the head wheel between the succesive heads 32 on the wheel. Preferably, the ceramic pieces 36 — which would be banded to the periphery of the head wheel 30 by epoxy or the like — would be made of Fotoceram (manufactured by Corning Glass Works), although forsterite or the like would work for the purpose intended. Such ceramics are characterized by a wear rate slightly faster than the ferrite parts of the heads 32.

Figure 1:
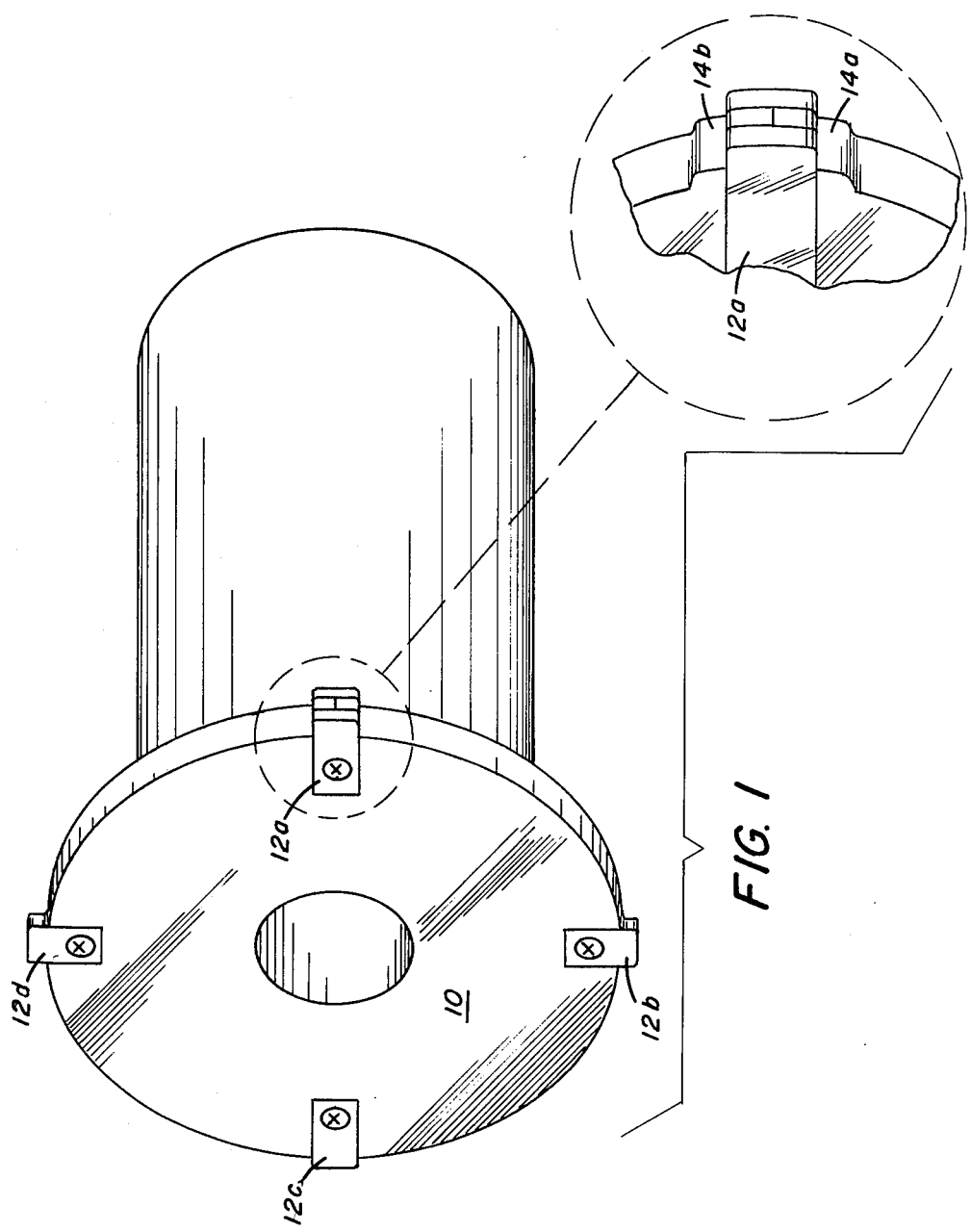
FIGS. 1 and 2 are perspective views which are useful in describing the invention.
Figure 2:
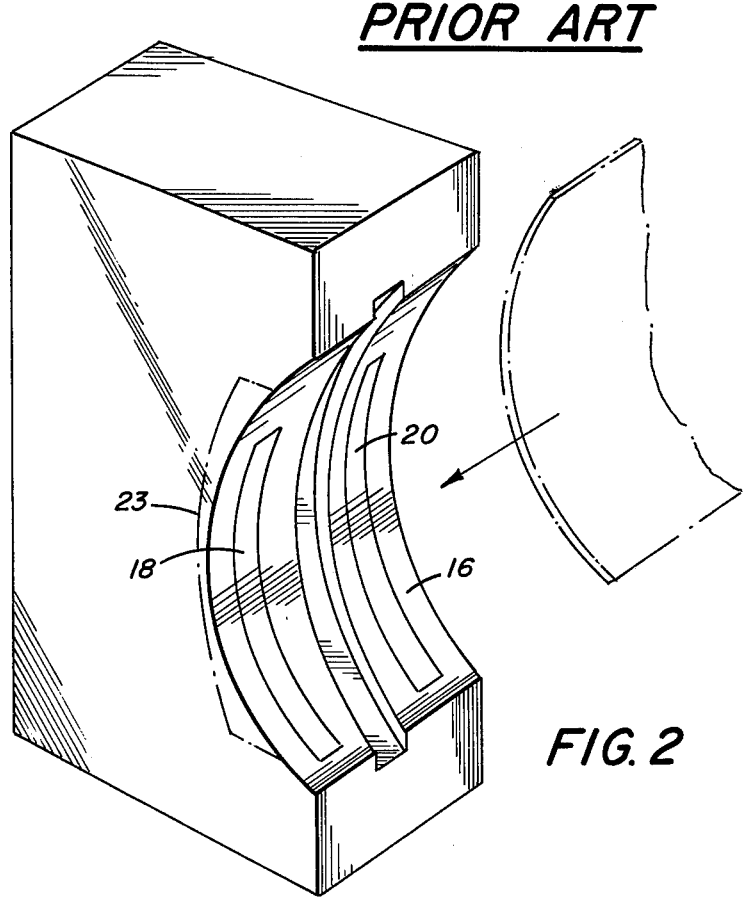
Figure 4:
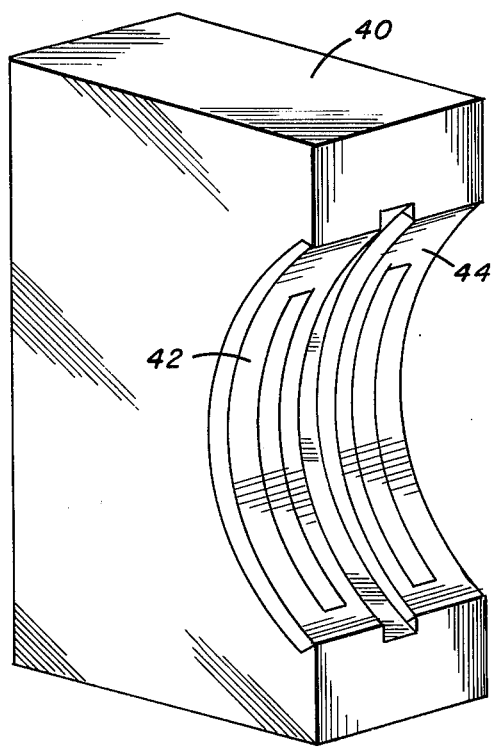
FIG. 4 is a perspective view of a vacuum guide modified in accordance with the invention to complement the head wheel shown in FIG. 3.

As previously stated, in order to realize the full advantages of the ceramic-ferrite heads by providing an improved head assembly, a vacuum guide must be provided which will not suffer an excessive change in its radius of curvature before the ceramic-ferrite heads wear out. FIG. 4 shows one embodiment of the invention as it relates to the vacuum guide. The main body 40 of the vacuum guide may be a conventional unmodified vacuum guide. The concave cylindrical guide surface 42, however, is provided with an insert 44, which is bonded to the guide surface 42, and which is comprised of ceramic having wear qualities like the ceramic discussed above. As such, the tendency of the guide to sustain time base error-producing wear (23, FIG. 2) is reduced.

Figure 5:
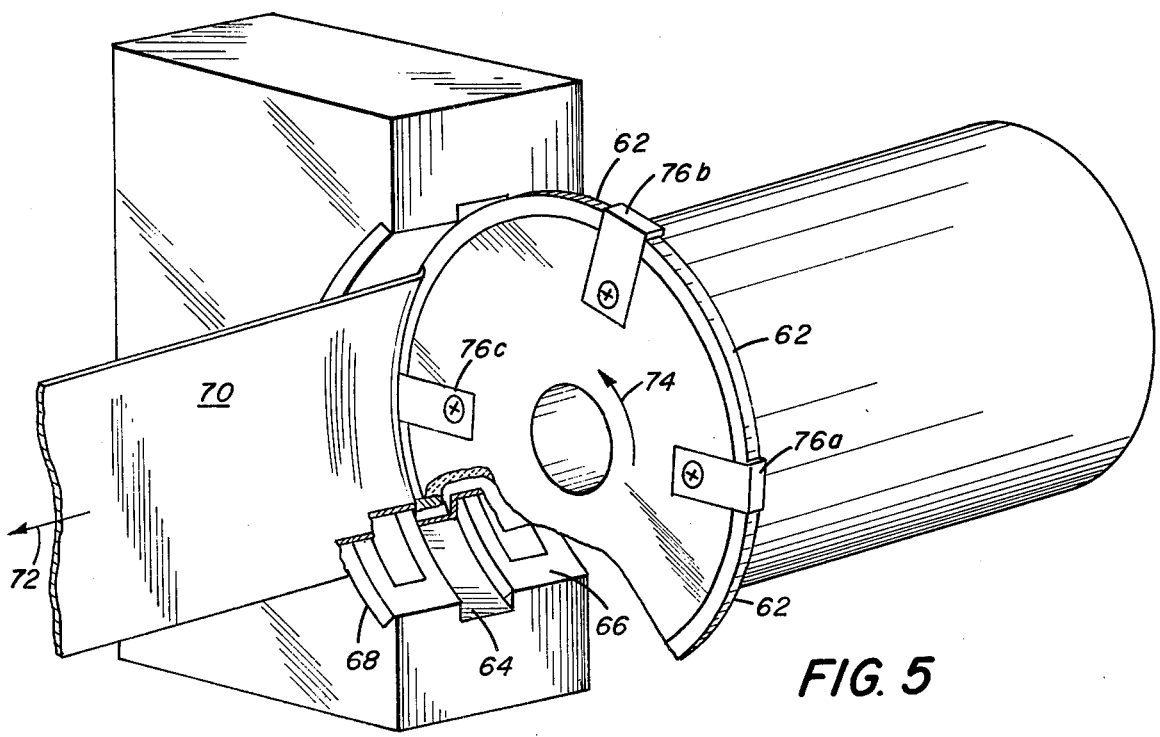
FIG. 5 shows a complete head assembly with modifications in accordance with the present invention.

A complete head assembly unit, as modified in accordance with the present invention, is shown in FIG. 5. As previously discussed, the head wheel drum 60 is provided with ceramic arcuate pieces 62 which extend slightly into the groove 64 during wheel rotation. The vacuum guide is provided with a guide surface 66 formed from an insert 68. During operation, recording tape 70 is advanced in the direction indicated by an arrow 72, while the head wheel drum 60 rotates in the direction indicated by an arrow 74. As the ceramic-ferrite recording heads 76a, b, c, and d repeatedly make contact with the advancing tape 70, information is recorded in slightly slanted lines, or tracks, across the recording tape 70.

The invention has been described in detail with particular reference to preferred embodiments thereof, but it will be understood that variations and modifications can be effected within the spirit and scope of the invention.

What is claimed is:

1. A head wheel assembly for use in a transverse scan video recorder, comprising:
    a. a head wheel having a plurality of substantially identical magnetic heads arcuately spaced evenly about the periphery of said head wheel;
    b. means for rotating said wheel;
    c. said magnetic heads mounted to and extending slightly from the periphery of said head wheel, said magnetic heads having transducer gap-defining parts comprised of ferrite material;
    d. ceramic material mounted to said head wheel and defining said head wheel periphery, said ceramic material comprising a plurality of discrete arcuate pieces respectively disposed on said head wheel and separated by said magnetic heads;
    e. a vacuum guide having a generally circular concave surface, a cylindrical groove in said surface, and at least one conduit through said guide for communicating vacuum to said concave surface;
    f. means for supporting said head wheel and said guide so that the periphery of said wheel aligns with the the groove of said guide, the gap-defining parts of said magnetic heads, during wheel rotation, extending slightly into said groove.

2. The apparatus of claim 1 wherein said vacuum guide is comprised of a body part and ceramic material, said ceramic material defining said circular concave surface, and being provided with said cylindrical groove and an aperture in communication with said conduit.

* * * * *